United States Patent [19]

Schneider

[11] Patent Number: 5,380,472
[45] Date of Patent: Jan. 10, 1995

[54] METHOD AND APPARATUS FOR MANUFACTURING CHAMBER MEMBERS FOR ACCEPTING LIGHT WAVEGUIDES

[75] Inventor: Reiner Schneider, Ebersdorf, Germany

[73] Assignee: Siemens Aktiengesellschaft, Munich, Germany

[21] Appl. No.: 53,685

[22] Filed: Apr. 29, 1993

[30] Foreign Application Priority Data

May 8, 1992 [DE] Germany ............................ 4215185

[51] Int. Cl.⁶ .......................... B29C 47/90; G02B 6/44
[52] U.S. Cl. .................................... 264/1.29; 264/174;
264/177.19; 264/211.12; 264/237; 425/71;
425/114; 425/325; 425/379.1; 425/380
[58] Field of Search ................... 264/211.12, 557–562,
264/174, 103, 237, 1.5, 566, 1.6, 209.3, 177.1,
177.19; 425/113, 114, 325, 326.1, 71, 378.1,
379.1, 380; 385/100

[56] References Cited

U.S. PATENT DOCUMENTS

| | | | |
|---|---|---|---|
| 2,728,104 | 12/1955 | Fisch | 264/177.17 |
| 3,296,661 | 1/1967 | Moustier . | |
| 3,538,210 | 11/1970 | Gatto . | |
| 3,708,253 | 1/1973 | Lemelson | 425/326.1 |
| 4,155,963 | 5/1979 | de Vacchis et al. | 264/1.5 |
| 4,199,224 | 4/1980 | Oestreich . | |
| 4,205,899 | 6/1980 | King et al. | 264/1.5 |
| 4,272,472 | 6/1981 | Hulin et al. | 264/174 |
| 4,474,426 | 10/1984 | Yataki | 264/1.5 |
| 4,528,148 | 7/1985 | Dotti | 264/1.5 |
| 4,575,326 | 3/1986 | French | 425/71 |
| 4,790,970 | 12/1988 | Kurth et al. | 264/209.4 |
| 4,814,133 | 3/1989 | Matsuno et al. | 264/1.5 |
| 4,997,258 | 3/1991 | Oestreich | 264/1.5 |
| 5,053,091 | 10/1991 | Giljam et al. . | |

FOREIGN PATENT DOCUMENTS

| | | | |
|---|---|---|---|
| 0086623 | 8/1983 | European Pat. Off. . | |
| 2449439 | 8/1984 | Germany . | |
| 2015418 | 9/1979 | United Kingdom . | |
| 835795 | 6/1981 | U.S.S.R. | 264/566 |

Primary Examiner—Jeffery Thurlow
Attorney, Agent, or Firm—Hill, Steadman & Simpson

[57] ABSTRACT

An apparatus for forming a chamber member which receives optical light waveguides comprises an extruder head for extruding the chamber member followed by a calibrating device which inserts members into each of the chambers to insure the desired dimensions of each of the chambers and a method of using the apparatus by extruding a chamber member, allowing the extruded chamber member to cool and then calibrating the dimension of the chamber walls of the chambers.

21 Claims, 3 Drawing Sheets ized chamber member provided with chambers for the acceptance of light waveguides is disclosed in U.S. Pat. No. 4,199,224, whose disclosure is incorporated herein by reference thereto and which claims priority from German Application 24 49 439. As disclosed, chambers are provided for receiving light waveguides which are placed in the chambers, and the light waveguides are largely protected against mechanical stresses. With an increasing number of fibers in the region of an optical cable, there is a desire to increase the packing density of the light waveguides and thereby, nonetheless, continue to insure their mechanical protection. As many light waveguides as possible should be arranged within the given chamber space. When, however, the chamber walls or, respectively, the chamber dimensions are not fabricated exactly enough within tolerances with respect to their dimensions within the framework of the manufacturing process, undesirable mechanical stresses on the light waveguides can occur in certain instances.

METHOD AND APPARATUS FOR MANUFACTURING CHAMBER MEMBERS FOR ACCEPTING LIGHT WAVEGUIDES

BACKGROUND OF THE INVENTION

The present invention is directed to an apparatus comprising an extruder head for the manufacturing of a chamber member provided with chambers for the acceptance of light waveguides.

An apparatus having an extruder head for the manufacture of chamber members provided with chambers for accepting light waveguides is disclosed in U.S. Pat. No. 4,199,224, whose disclosure is incorporated herein by reference thereto and which claims priority from German Application 24 49 439. As disclosed, chambers are provided for receiving light waveguides which are placed in the chambers, and the light waveguides are largely protected against mechanical stresses. With an increasing number of fibers in the region of an optical cable, there is a desire to increase the packing density of the light waveguides and thereby, nonetheless, continue to insure their mechanical protection. As many light waveguides as possible should be arranged within the given chamber space. When, however, the chamber walls or, respectively, the chamber dimensions are not fabricated exactly enough within tolerances with respect to their dimensions within the framework of the manufacturing process, undesirable mechanical stresses on the light waveguides can occur in certain instances.

SUMMARY OF THE INVENTION

The object of the present invention is to disclose an apparatus for forming a chamber, whose dimensions during the manufacturing operation can be kept optimally largely constant in an optimally simple and reliable way. This object is inventively achieved in an apparatus which has an extruder head for manufacturing the chamber member provided with the chambers for the acceptance of light waveguides and includes a calibration device or means provided at the output of the extruder head, which calibration device engages into the chambers and the calibration device is arranged at such a distance relative to the extruder head that the material of the chamber member is adequately hardened, but is still plastically deformable at least in the region of the chambers at the input to the calibration device.

Since the manufacture of the chamber member tends to deformations, for example as a consequence of warping during the cooling or as a consequence of different exit speeds from the profile nozzle of the extruder head, the recalibration of the invention creates the possibility of offering the chamber dimensions with precision in a simple way. Since the chamber member is, in fact, already adequately hardened but is still plastically deformable, this type of calibration involves a plastic reshaping of the chamber member, whereby the individual chambers are offered with the desired profile and within extremely narrow tolerances at the output of the device. Largely independent of the material composition of the chamber member and of other manufacturing conditions, the invention supplies a precisely manufactured product as initial material for the insertion of the light waveguides The invention is especially effective given the extrusion of materials from semi-crystalline material, for example polyethylene, because, for example, the risk of self-distortion is particularly great with this type of material. The invention is also particularly advantageous when chamber profiles having deep incisions are produced.

The invention is also directed to a method for manufacturing an extruded chamber member provided with chambers for the acceptance of light waveguides, which has the improvements that a calibration in the region of the chamber walls is implemented after the extrusion of the chamber member.

Other advantages and features of the invention will be readily apparent from the following description of the preferred embodiments, the drawings and claims.

DESCRIPTION OF THE PREFERRED EMBODIMENTS

Figure 1:
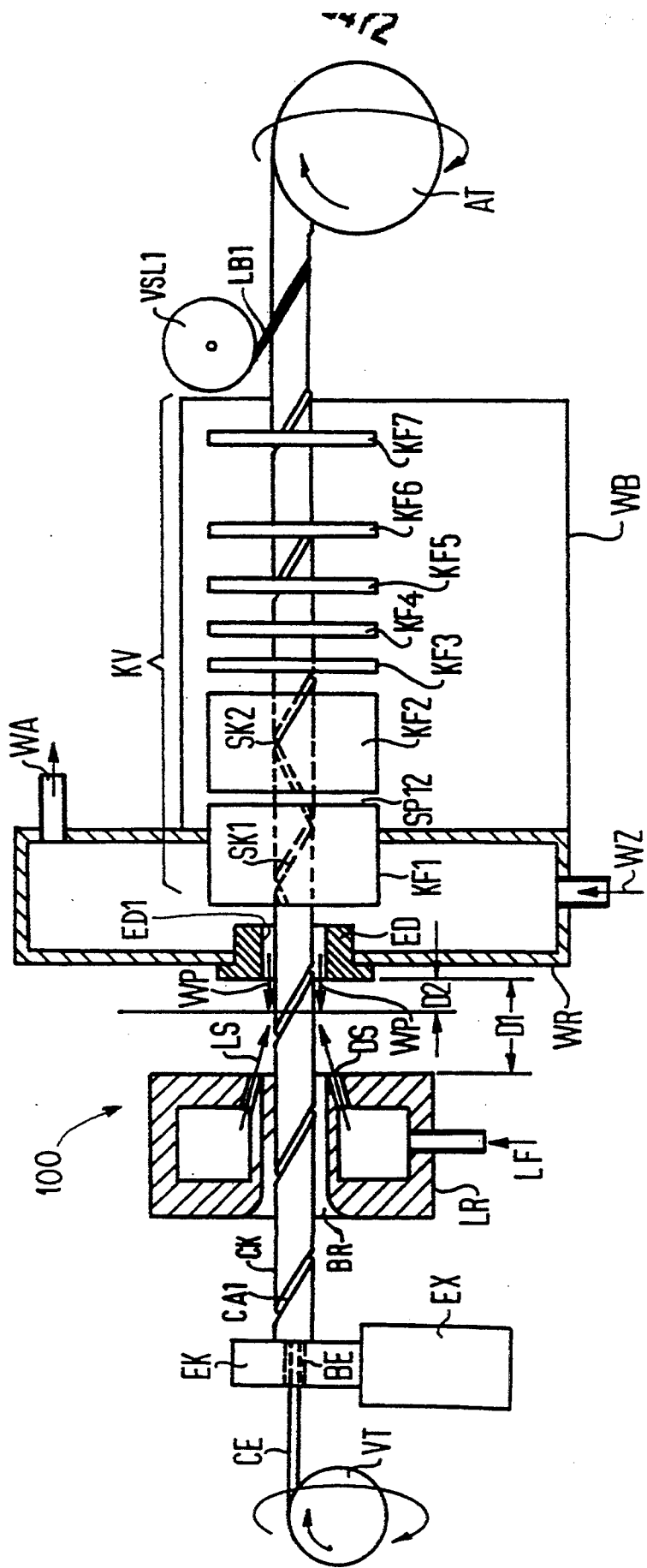
FIG. 1 is a schematic illustration of an apparatus of the invention for recalibration of the chamber member.
Figure 2:
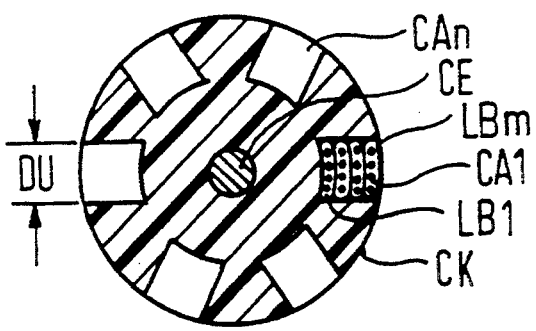
FIG. 2 is a transverse cross sectional view of the structure of the chamber member.

The principles of the present invention are particularly useful in an apparatus schematically illustrated in FIG. 1 and generally indicated at 100. The apparatus 100 includes a rotating supply drum VT from which a tensile element CE, which may be, for example, either of steel or plastic material, is introduced into a bore BE of an extruder head EK of an extruder EX. A profile member or chamber member CK is extruded onto the central or tensile element CE by the extruder head EK. This chamber member CK, as illustrated in FIG. 2, completely surrounds the central element CE and has a plurality of outwardly open, preferably rectangular chambers CA1 through CAn. The chambers CA1 through CAn serve the purpose of accepting light waveguides, wherein m light waveguide bands or ribbons LB1 through LBm are shown within the chamber C1 of the present example. Each of the bands or light waveguide ribbons LB1 through LBm comprises a plurality of waveguides. In FIG. 2, four waveguides are in each of the bands or ribbons and are illustrated as points. Especially high packing densities can be achieved with such a band or ribbon arrangement. However, it is also possible to accommodate other configurations of light waveguides in the inside of each of the chambers CA1 through CAn instead of the waveguide ribbons. It is also not absolutely necessary that the chambers comprise rectangular cross sections, as shown, but the chambers can have other cross sections as desired.

It is critical that the dimensions of the chambers CA1 through CAn be continuously exactly manufactured with low tolerance values, because, for example, high packing densities without an inadmissible stressing of the light waveguides can only be realized in this manner.

The chamber member CK obtained at the output of the extruder head EK in FIG. 1 (only one chamber element CA1 is shown in the drawing for purposes of simplification) is initially present as a soft or, respectively, viscous melt. The quality of the chamber dimension depends, among other things, on the height of the temperature in the extruding head, what materials or, respectively, what material compositions are used for the chamber member CK, how rapidly and how the subsequent cooling is implemented, etc. The chamber dimensions obtained in this way do not meet or at least do not adequately meet the tolerance demands made of the dimensioning of the chamber dimensions required for high packing densities.

For the purpose of solidifying the chamber element CK, an annular blast pipe LR is first provided as an admission or pre-cooling, and the chamber element will be conducted through a bore BR of the blast pipe LR. The annular blast pipe LR comprises an annularly proceeding slot DS that extends obliquely relative to the longitudinal axis and, thus, relative to the throughput direction of the chamber element. The slot DS forms an angle in an approximate range of 8° to 30° to the axis of the element passing through the blast pipe LR. A gaseous coolant is introduced through an inlet LF to the interior of the blast pipe LR and is, for example;, compressed air. This compressed air will exit through the annular slot DS, as indicated by the arrows LS, and effect a certain cooling due to the air cushion formed on the outer surface of the chamber member CK. A change in shape of the yet largely soft chamber member CK by the gas stream in this region is avoided.

Immediately following the annular blast pipe LR is a cooling unit WR, which has an entry nozzle ED with a bore ED1. A coolant fluid, which is water, in the cooling unit WR passes through a gap formed between the bore ED1 and the outer surfaces of the chamber member CK, as indicated by the arrow WP. The blowing of the compressed air, as indicated by the arrows LS from the blast pipe LR act to limit the distance that the water indicated by the arrows WP can proceed toward the blast pipe, and the blast of cooling air acts to strip the liquid coolant from the surface of the member CK. The blowing of the fluid coolant is expedient because the coolant proceeding in the direction of the spray head would intensely and non-uniformly cool the extruded member CK and, therefore, deform it so that the extruded member would be difficult to draw through the following calibration unit or could not be drawn therethrough at all.

It is advantageous to make the distance D1 between the annular fluid cooling member WR and the annular blast pipe LR adjustable. The distance D1 falls in a range which is expediently selected to be approximately between 3 cm and 12 cm.

The fluid coolant emerging from the annular gap of the entry nozzle ED is kept at the circumferentially uniform distance D2 by the annular blast pipe LR. What is thereby achieved is that the surface of the plastic material of the chamber member CK remains circumferentially uniformly deformable upon entry into the first shaping disk KF1 of a calibrating device or calibration means KV. The incipient cooling of the chamber member eliminates the stickiness of the plastic surface of the chamber member CK as a preparation for the following calibration. The cooling path and the cooling time with a given manufacturing speed should, thus, only be of such a magnitude that a plastic deformation is still possible in the inside of the incipiently cooled plastic cross section in the following calibration in a simple way.

The distance D2, wherein the coolant corresponding to the arrows WP is still present in the region of the chamber member CK, should be correspondingly adjustable, for example by changing the pressure in the region of the annular blast pipe LR, and the distance D2 should expediently approximately amount to between 0.5 cm and 2 cm.

The bore ED1 of the entry nozzle ED has a diameter that is selectively correspondingly larger, preferably in a range of 1 mm to 3 mm than the outside diameter of the chamber member CK so that a certain, not inconsiderable amount of the fluid emerges opposite to the direction of introduction of the member CK. It should also be taken into consideration that additional coolant emerges in the region of each of the chambers of the chamber element CK. It is especially advantageous when the water in these chambers is likewise held back by the airstream of the annular flow pipe or, respectively, is blown out of the chambers. The emergence of the coolant in the regions of the entry nozzle ED, which is illustrated by the arrows WP, moreover also effects a type of gentle "glide bearing" for the chamber element CK that has already incipiently cooled in this region, at least at its outer surface and should be solidified and provided with a protective skin. However, it is expedient when the interior of the chamber member CK still remains plastically deformable in the region of the following calibration device. Thus, the calibration can be implemented in an especially gentle and nonetheless efficient way. The fluid cooling means WR likewise annularly surround the chamber member CK, whereby the admission of the fluid is through a fluid entrance WZ and the outlet lies at WA. The temperature of the coolant, particularly water, expediently lies roughly in the range of 15° C. and 25° C. The cooling of the chamber member CK mainly occurs in the region of its surface so that a solid protective skin occurs on the outside that enables the calibration without sticking to the calibration tool. Those regions of the chamber member lying farther toward the inside or center, which are under the protective skin, by contrast, are still soft and plastically deformable.

A calibration, which is effected with the calibration device KV, occurs for the observation of exact dimensions in the dimensioning of the chambers. This calibration device KV comprises a plurality of shaping disks following one after another in the throughput direction and, as illustrated, there are seven disks KF1 through KF7. The first two shaping disks KF1 and KF2 mainly serve the purpose of plastic deformation. They comprise salient webs, which are schematically illustrated as SK1 and SK2, in their through bore, which exactly correspond to the desired chamber size in the chamber element CK of FIG. 2. For simplification, the drawing only shows one of the webs for each of the two disks KF1 and KF2, and this single disk namely enters into the chamber CA1, which is also the only chamber illustrated in FIG. 1. The salient webs in the inside of the shaping disks KF1 and KF2 serve as calibration elements and proceed in a fashion similar to a multiplex thread, i.e., are helical lines having a rectangular thread cross section and n flights given n chambers each having the respective width DU of a chamber, which is illustrated in FIG. 2. Each of the webs enters into each of the chambers CA1 through CAn of the chamber member CK for the purpose of correcting the shape. The dimensioning is thereby selected so that the plastic deformation of the chamber member as a whole is implemented at least in the region of the shaping disks KF1 and KF2. The male members of the shaping disks projecting into the chambers of the profile to be calibrated are expediently somewhat broader than the extruded chambers. Thus, the profile does not get stuck in the calibration and the segment shaped between the chambers must be capable of being outwardly displaced, for example into a corresponding gap. This plastic reshaping has the advantage that the chamber profile that was not manufactured or, respectively, obtained with adequate precision in the extrusion process yields a significantly more exactly dimensioned chamber profile CA1 through CAn at the output of the shaping disks KF1 and KF2, due to the after-treatment and the additional plastic deformation than existed at the output of the extruder EK or, respectively, of the cooling path.

The extent of the plastic deformation in the region of the first shaping disk is dependent on the precision of the extruder member and can amount to several tenths of a millimeter. The second shaping disk KF2 essentially merely fixes the plastic deformation of the first shaping disk and only a slight plastic deformation will occur at this second disk.

The extension of the shading disk KF1 in the axial direction amounts to approximately 2 cm through 5 cm, whereas the extension approximately in the range of between 0.2 cm and 5 cm is advantageous for the second shaping disk KF2. A gap SP12 that is advantageously selected in the range of between 1 cm and 4 cm lies between the two shaping disks KF1 and KF2. This gap has the purpose of allowing more coolant that also acts as a lubricant and is contained in the cooling basin WB to proceed to the surface of the chamber element CK. Overall, a calibrating length for the guidance of the chamber element CK of at least 20 cm through the calibration device KV is expedient.

The reliable forming of the chamber with the assistance of the aforementioned calibration and the pitch-stabilizing effect of the calibration allow the insertion or stranding of light waveguides or, respectively, light waveguide bands immediately following the manufacturing process for the chamber member CK. For example, the stranding can be on line and in a continuous work sequence. This is indicated in FIG. 1 by a supply reel VSL1 from which a light waveguide or light waveguide band LB1 is taken down. In reality, of course, a plurality of such supply reels VSL1 are provided with at least one per chamber, and n supply reels per chamber are required in the stacked structure of FIG. 2 having n light waveguide ribbons per chamber.

Since the spirally proceeding chambers, for example CA1, are produced in this line, the angular position of the chambers is fixed at the exit of the calibration. When the length of the lay that is established by the ratio of haul-off speed and rotational speed of the chamber element does not change, the insertion point for the light waveguides or, respectively, the light waveguide bands LB1 always remain constant once it has been selected.

A chamber member CK generally withstands only a certain plurality of active calibration disks. When this plurality is exceeded, then the friction of the calibration increases to such an extent that there is a risk that the chamber element will get stuck in the calibration device. What is generally valid is that the distance of the individual calibrating disks KF1 through KF7 from one another should be selected smaller given low throughput speeds and should be selected correspondingly greater given high throughput speeds. When, for example, the chamber member CK is formed of a material, such as HDPE (high-density polyethylene), and has an outside diameter of 10.5 mm and has six chambers having a width of 1.5 mm and a height of 2.7 mm, then the plurality of disks is selected to equal 20, then the following allocation occurs:

| Speed | Length of Calibrating Path (KV) |
| --- | --- |
| 4 m/min | 200 mm |
| 8 m/min | 400 mm |
| 12 m/min | 600 mm. |

Whereas the shaping disks KF1 and KF2 comprise an extent in axial direction that amounts to a multiple of the chamber width DU, at least 10 through 20 times or 20 mm through 50 mm, the following shaping disks KF3 through KF7 are dimensioned so that their axial extent lies approximately in tile region of only 1 through 2 times the aperture width DU of the chamber element corresponding to FIG. 2 or the amounts of 1.5 mm through 3 mm. This projection serving the purpose of calibration, thus, projects essentially only pin-like into the corresponding chamber members. Their main function is to hold the individual profile segments of the plastic material that lie between the individual chamber openings CA1 through CAn in FIG. 2 in the correct position. Their influence on the dimensions of the chamber openings CA1 through CAn itself is, thus, significantly less when compared to the shaping disks KF1 and KF2. The overall calibration device KV expediently lies in the cooling means or, respectively, the cooling basin WB that is filled with a liquid coolant, preferably water. The spacing of the shaping disks KF3 through KF7 are expediently selected increasingly greater in the throughput direction. The longitudinal extent or wall thickness of the shaping disks KF3 through KF7, by contrast, remains essentially constant. The increasingly enlarging distance between the individual calibration disks KF3 through KF7 has the advantage that a long calibration path is realized with optimally few calibration disks and, thus, with low friction. The distance between the calibration disks can be all the greater the further the cooling has progressed.

The individual webs in the shaping disks KF3 through KF7 serving the purpose of calibration should be; expediently selected to that these are exactly matched to the contour of the respective chamber openings.

After calibration, the chamber member CK is wound onto a rotating take-up drum AT or as charged with the light waveguides in a continuous process. It is also possible to fashion the drums VT and AT stationary and to employ a rotating extruder head EK.

Figure 3:
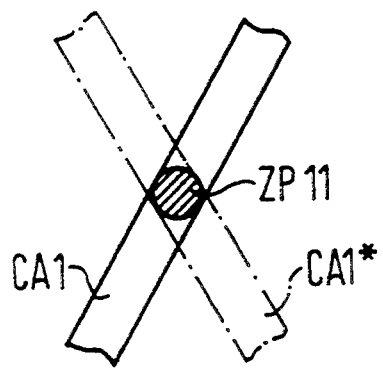
FIG. 3 is a schematic view illustrating a design of a calibration element for alternate directions of lay of the chamber profiles.

In the simplest case, circularly cylindrical male members or pins projecting into the through opening can be employed as calibration elements for the shaping disks KF3 through KF7, as shown in the schematic illustration of FIG. 3. A part of the chamber opening CA1 that proceeds on a straight line, for simplification of illustration, is shown herein. The circular cylindrical male member ZP11 for one of the shaping disks KF3 through KF7 projects into the chamber. In terms of its outside dimension, this male member ZP11 corresponds to the desired value DU of the chamber width illustrated in FIG. 2, and its depth is dimensioned so that it lies against or nearly lies against the lower end or bottom or floor of the chamber opening. The employment of a round male member has the particular advantage that these, first, can be manufactured in a simple way and, second, they can be utilized for different pitches or, respectively, for changing directions of lay of the chamber openings. For example, this is not the case with respect to the webs SK1 and SK2 at the shaping disks KF1 and KF2. The webs SK1 and SK2 would, thus, have to be omitted if the chamber openings have an alternating direction of lay. In many instances, namely the chamber elements CA1 through CAn of FIG. 1 are not continuously applied in the same sense, but periodically change their circumferential direction in the fashion of SZ-stranding. Since the profile of the male member ZP11 has rotational symmetry, a complete calibration remains possible with the circular cylindrical male member ZP11, even given a different running direction of the chamber opening. The chamber opening CA1*, indicated in broken lines and which, for example, can be a continuation of the chamber opening CA1 after a corresponding reversal of the direction shows this and thus occurs at a chronologically later time than the course of the chamber wall according to CA1.

A male member is likewise provided in the inside of the shaping disks KF3 through KF7 for each chamber CA1 through CAn in a manner similar to the shaping disks KF1 through KF2. Thus, the total of n inwardly projecting male members are distributed in the fashion of teeth over the inside bore.

Figure 4:
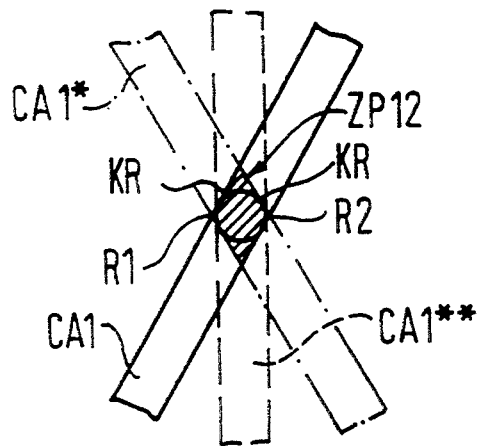
FIG. 4 is a schematic design illustration of another embodiment of a calibration element for changing directions of lay.

It is not absolutely necessary to provide a rotationally symmetrical web or male member in the inside of the shaping disks KF3 through KF7 for each chamber opening CA1 through CAn of FIG. 2. FIG. 4 shows the cross section of a male member ZP12 that has the approximate shape of a trapezoid with two rounded-off corners R1 and R2 that lie opposite one another. The curvature in the region of these rounded portions R1 and R2 is simply defined by an imaginary, inscribed circle KR, whose diameter corresponds to that of the circular cylindrical male member ZP11 of FIG. 3. Here, too, it is thus guaranteed that the profile cross section of the male member ZP12 is always present for the different running directions of the chambers CA1, CA1* and CA1** so that an exact calibration of the chamber walls is guaranteed, namely independent of the respective length of lay and for changing rotational senses of the chamber elements as well.

It is expedient during the approach when the chamber member CK is not opposed by an excessively high resistance. It is, therefore, advantageous when the individual webs or male members, for example SK1, SK2, ZP11 or ZP12 illustrated in FIGS. 1, 3 and 4, serving the purpose of calibration at the shaping disks KF1 through KF7 initially do not engage into the corresponding chambers during the approach procedure.

Figure 5:
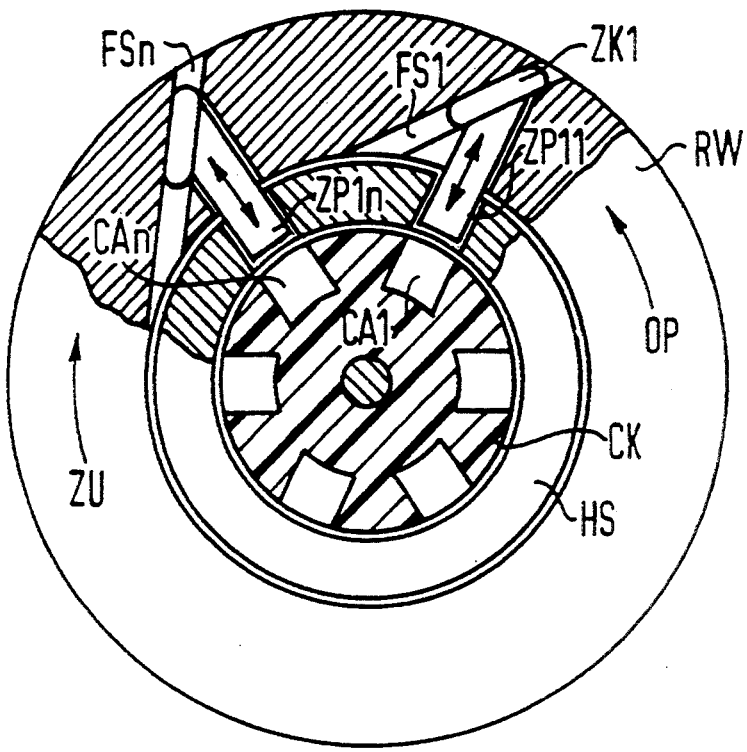
FIG. 5 is an end view with portions broken away for purposes of illustration of a tool for the implementation of the calibration, with the tool being illustrated in a disengaged condition.
Figure 6:
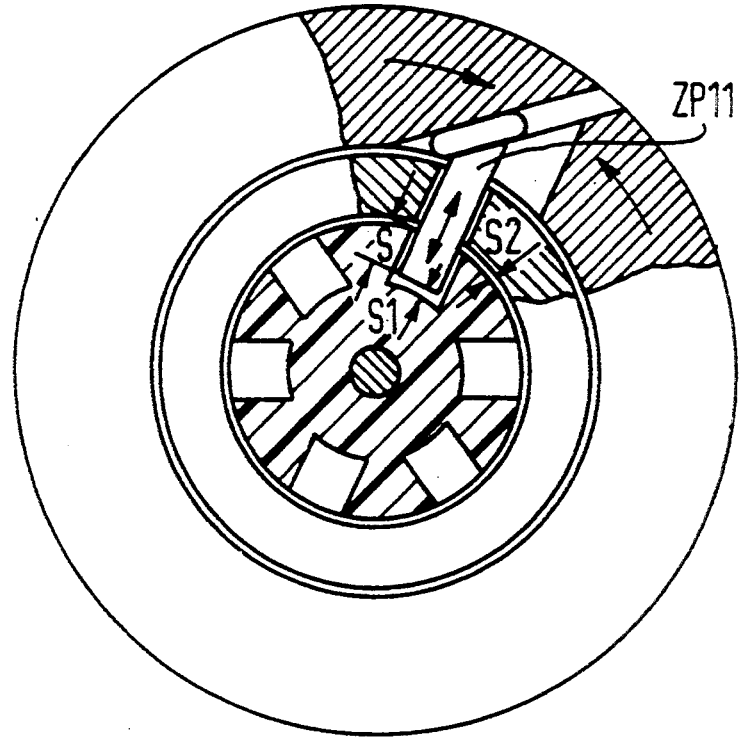
FIG. 6 is an end view of the tool of FIG. 5 with portions broken away for purposes of illustration illustrating the, tool in a calibrating or engaged position or condition.

FIG. 5 schematically shows how the chamber member CK proceeds in the inside of an annular holding tool RW that is a component part of guide members KF1 through KF7. Given n chambers, the holding tool RW comprises a series of n guide slots FS1 through FSn that each respectively accept a broadened or enlarged head, for example ZK1, of a male member, for example ZP11, for the chamber CA1 serving as a calibration element. Upon rotation of the holder RW in the direction of arrow ZU, these obliquely proceeding guide slots FS1 through FSn effect a displacement of the male members, for example ZP11, guided in an inside sleeve HS in an inward direction, which is a direction toward the opening of the respective chamber, for example CA1. Thus, the element ZP11 will be engaged into the chamber and subsequent calibration of the chamber. This rotation of the holder tool RW occurs after the end of the approach procedure. When, by contrast, the annular tool RW is turned in the direction of the arrow OP, then the male members, such as ZP11 through ZP1n, are removed from the chambers CA1 through CAn and, thus, no longer engage in these openings, as shown in FIG. 5. This is, thus, the position in which the approach of the production line is facilitated. After all operating parameters have been reached, as already set forth, the male members ZP11 through ZP1n are introduced into the chambers CA1 through CAn as a result of rotation of the tool RW according to the arrow ZU and effect the desired calibration. The respective calibration elements, for example ZP11, should only press against the side walls of the respective chambers so that a small gap S1 of approximately 0.01S through 0.03S remains free at the floor, wherein S indicates the penetration depth of the calibration element into the respective chamber. A small gap S2 should also remain in the circumferential region of the chamber member CK, this gap S2 being expediently selected in a range of between 0.01S and 0.03S. Room is thus created for the acceptance of material which has been displaced by the step of calibration.

Although various minor modifications may be suggested by those versed in the art, it should be understood that I wish to embody within the scope of the patent granted hereon all such modifications as reasonably and properly come within the scope of my contribution to the art.

I claim:

1. In an apparatus comprising an extruder head for manufacturing a chamber member provided with outwardly open and spirally proceeding chambers for the acceptance of light waveguides, the improvements comprising a cooling unit being positioned following the extruder head in a throughput direction of the chamber member for receiving the chamber member a calibrating device being provided at an output of the cooling unit, said calibrating device engaging into the chambers, said calibrating device being arranged at a distance from the extruder head so that the material of the chamber member has adequately hardened but is still plastically deformable, at least in a region of the chambers at an input of the extruded article into the calibrating device, said calibrating device being a multipart device formed by a plurality of shaping disks following one after another in the throughput direction.

2. In an apparatus according to claim 1, which further includes an annular blast pipe for directing a coolant stream onto the chamber members obliquely relative to the throughput direction being provided following the extruder head and before the calibrating device.

3. In an apparatus according to claim 1, wherein the shaping disks including shaping disks with different axial extent in the throughput direction and the shaping disks are arranged with the disks with the greater axial extent being a first group arranged to follow the cooling unit and the disks with a lesser axial extent following the first group of disks.

4. In an apparatus according to claim 1, which includes an annular blast pipe being arranged between the extruder head and the cooling unit, said annular blast pipe directing a cooling stream onto the chamber member obliquely relative to the throughput direction and toward the cooling unit.

5. In an apparatus according to claim 4, wherein a distance between the annular blast pipe and the cooling unit is adjustable.

6. In an apparatus according to claim 4, wherein coolant of the cooling unit emerges from a bore of an entry nozzle opposite to the throughput direction of the chamber member.

7. In an apparatus according to claim 6, wherein the emerging coolant is present on the cooling chamber over a length of 0.5 cm through 2 cm, said length being set by a corresponding position of the annular blast pipe.

8. In an apparatus according to claim 1, wherein the coolant present in the cooling unit is a liquid coolant.

9. In an apparatus according to claim 3, wherein the distance between the shaping disks increases as viewed in the throughput direction.

10. In an apparatus according to claim 1, wherein the guidance of the chamber member over at least 20 cm occurs within the calibration device.

11. In an apparatus according to claim 1, which includes means providing a cooling medium in a region of the shaping disks.

12. A method for forming a chamber member having outwardly opening and spirally proceeding chambers comprising the steps of extruding the chamber member provided with the outwardly opening and spirally proceeding chambers, then directing a cooling medium on the chamber member to cool the member and while cooling calibrating by inserting at least two calibrating elements provided on shaping disks spaced along a throughput direction into each chamber to calibrate the dimension of the chamber walls of each chamber.

13. A method according to claim 12, which includes, subsequent to calibrating the chambers, immediately inserting light waveguides into the chambers.

14. In an apparatus according to claim 1, wherein the shaping disks of the calibrating device comprises at least one web-like projection serving as a calibrating element for each respective chamber, each web-like projection having a width corresponding to the chamber width and a height being selected to be approximately equal to the chamber depth.

15. In an apparatus according to claim 14, wherein each of the web-shaped calibration elements extends helically as viewed in the throughput direction.

16. In an apparatus according to claim 14, wherein the web-shaped calibrating elements engaging into the respective chamber openings have a cross section that allows a change in the wrap direction of the chamber opening.

17. In an apparatus according to claim 16, wherein the web-shaped calibrating elements have a circular cross section.

18. In an apparatus according to claim 16, wherein the calibrating element is selected to have a trapezoidal cross section having two rounded-off corners lying opposite one another.

19. In an apparatus according to claim 14, wherein the calibrating elements projecting into the chamber openings are fashioned outwardly retractable in a radial direction for an approach procedure.

20. In an apparatus according to claim 19, wherein each of the calibrating elements has a head received in an oblique slot of a rotating tool element surrounding the shaping disk, so that movement of the element in one direction introduces each of the calibrating elements into their respective chambers and a rotation in the opposite direction withdraws each of the calibrating elements.

21. In an apparatus according to claim 14, wherein the calibrating elements press against the chamber members only in the respective region of the lateral chamber walls.

* * * * *